(12) United States Patent
Cheng

(10) Patent No.: US 10,183,250 B2
(45) Date of Patent: Jan. 22, 2019

(54) DUST COLLECTOR CAPABLE OF RECOLLECTING PARTICULATE DUST IN THE FILTER BARREL

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 86 days.

(21) Appl. No.: 15/383,568

(22) Filed: Dec. 19, 2016

(65) Prior Publication Data

US 2018/0169558 A1 Jun. 21, 2018

(51) Int. Cl.
*B01D 46/00* (2006.01)
*B01D 46/24* (2006.01)
*B01D 50/00* (2006.01)

(52) U.S. Cl.
CPC ..... *B01D 46/0065* (2013.01); *B01D 46/0086* (2013.01); *B01D 46/2403* (2013.01); *B01D 50/002* (2013.01)

(58) Field of Classification Search
CPC .............. B01D 46/00; B01D 46/0065; B01D 46/0086; B01D 46/04; B01D 46/4227; B01D 2279/40
USPC ..................... 55/282–305; 96/417
See application file for complete search history.

(56) References Cited

U.S. PATENT DOCUMENTS

| 3,898,414 | A | * | 8/1975 | Hawley | B01D 46/0075 |
| | | | | | 219/72 |
| 2005/0204504 | A1 | * | 9/2005 | Zancan | A47L 9/244 |
| | | | | | 15/314 |
| 2012/0260454 | A1 | * | 10/2012 | Lester | A47L 5/28 |
| | | | | | 15/327.1 |
| 2015/0026918 | A1 | * | 1/2015 | Sauer | A47L 9/14 |
| | | | | | 15/347 |
| 2015/0252758 | A1 | * | 9/2015 | Woodward | F02M 35/086 |
| | | | | | 95/25 |

* cited by examiner

Primary Examiner — T. Bennett McKenzie
(74) Attorney, Agent, or Firm — Ming Chow; Sinorica, LLC

(57) ABSTRACT

A dust collector capable of recollecting the particulate dust is disclosed. The dust collector comprises a collector body having a dust collection tube, a dust collection barrel, a filter barrel which comprises a filter net and an air conduit with one end connected to the inner portion of the filter barrel and another end formed into an air outlet adaptor, a dust clean device and an air suction unit which drives the air with particulate dust to pass the filter net and a cover used to either close or open the air outlet adaptor. When the particulate dust has been accumulated on the filter net more than a preset volume, the dust collector will start to operate its clean maintenance process. The cover will be uncovered from the air outlet adaptor and one end of the dust collection tube will be fixed onto the air outlet adaptor.

8 Claims, 6 Drawing Sheets

DUST COLLECTOR CAPABLE OF RECOLLECTING PARTICULATE DUST IN THE FILTER BARREL

BACKGROUND OF THE INVENTION

Field of the Invention

The present invention relates to a dust collector, particularly relates to a dust collector capable in recollecting particulate dust from the filter barrel of the collector.

Brief Description of the Prior Art

Dust collector has been used in a factory for wood or metal works to collect the dust produced, particularly the particulate dust, to clean the environment. This is even more necessary when the air flow in the factory is not good. Workers in the factory may absorb the dust and damage their health.

A conventional dust collector is shown in FIG. 1 which is a partially sectional view of the same. The dust collector 1 generally has an air conduit 2 with an air inlet 3 and an air outlet 4 as well as a dust barrel 5. A blower fan 6 is equipped by the air inlet 3. A filter barrel 7 and a dust bag 8 are sleeved on the air outlet 4. With this structure, the dust collector 1 will suck the air together with particulate dust into the dust barrel 5 from the air inlet 3. The particulate dust with relative larger dimension will be first collected in the dust barrel 5. The residual air with particulate dust in relative small dimension will be further filtered by the filter barrel 7 and collected in the dust bag 8.

Although the conventional dust collector can collect the dust produced in the factory, it is noted there is always a leakage of particulate dust from the dust bag 8 when a maintenance of the dust collector 1 to open and clean the filter barrel 7. This means a secondary pollution will be caused.

SUMMARY OF THE INVENTION

It is therefore the principle object of the present invention is to provide a dust collector which can completely collect the particulate dust in the environment without a secondary pollution.

Another object of the present invention is to provide a dust collector equipped with a particulate dust detection unit to automatically detect the volume of the particulate dust collected.

Still another object of the present invention is to provide a dust collector equipped with an alarm unit to signal a warning the particulate dust has been collected to a preset volume and in need a maintenance to clean the filter barrel.

The principle feature of the dust collector of the present invention is to provide an air suction unit to guide the air with particulate dust into the dust collector through a dust collection tube.

Another feature of the dust collect of the present invention is to provide a filter barrel having an air conduit with one end connected to the inner portion of the filter barrel and another end formed into an air outlet adaptor. A cover is used to either close or open the air outlet adaptor.

Still another feature of the dust collector of the present invention is to provide a filter net equipped with a dust clean device to shake down the particulate dust from the filter net.

Therefore, the dust collector in accordance with the present invention comprises a collector body having a dust collection tube, a dust collection barrel, a filter barrel which comprises a filter net and an air conduit with one end connected to the inner portion of the filter barrel and another end formed into an air outlet adaptor, a dust clean device and an air suction unit which drives the air with particulate dust to pass the filter net of the filter barrel and a cover used to either close or open the air outlet adaptor.

BRIEF DESCRIPTION OF THE DRAWINGS

Those and other advantages, objects and features of the dust collector in accordance with the present invention will become apparent from the below detailed description of the preferred embodiment of the invention with reference to the accompanying drawings, wherein.

DETAILED DESCRIPTION OF THE PREFERRED EMBODIMENT

Figure 1:
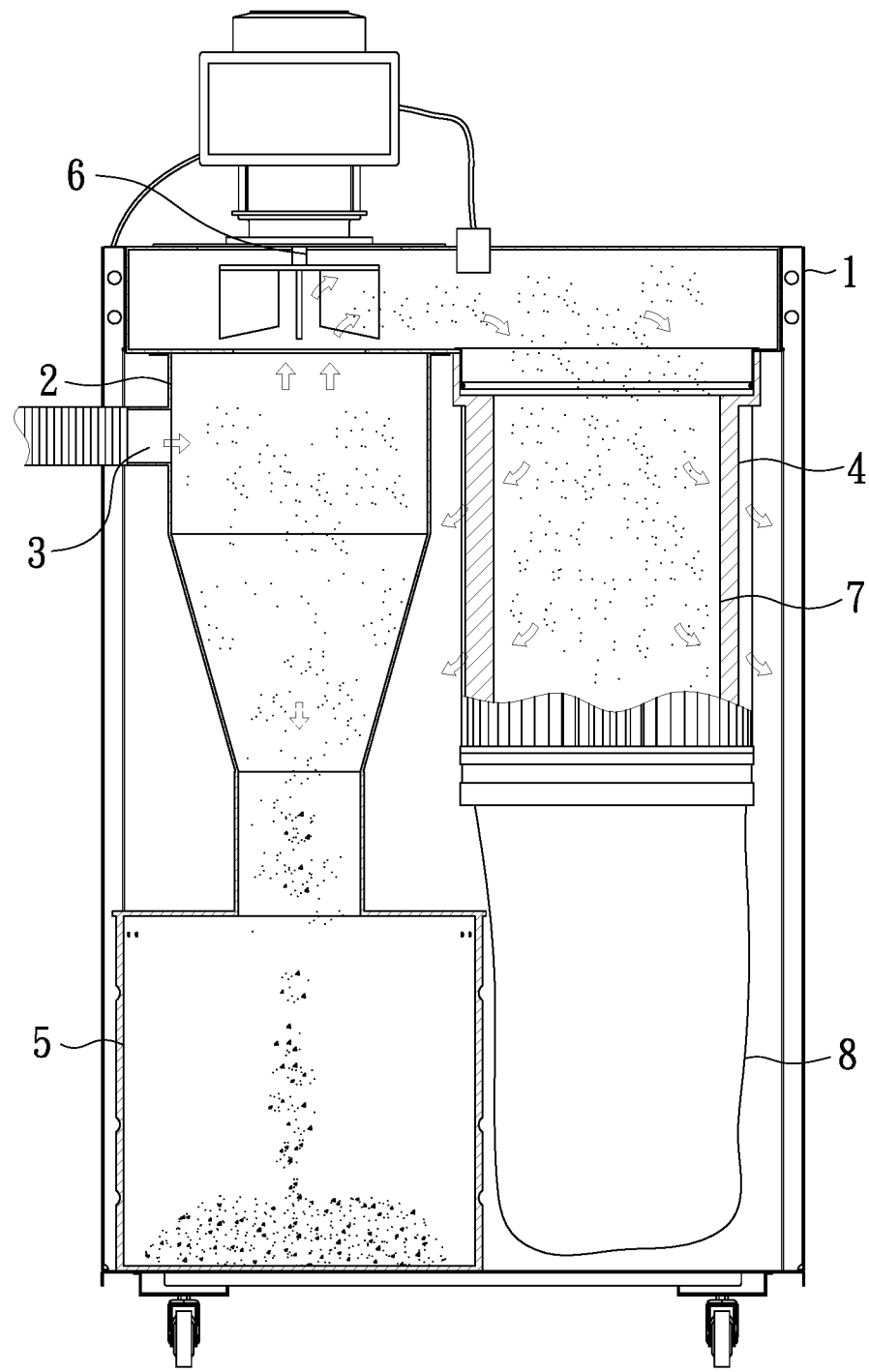
FIG. 1 is partially sectional view of a conventional dust collector illustrating the same being in use.
Figure 2:
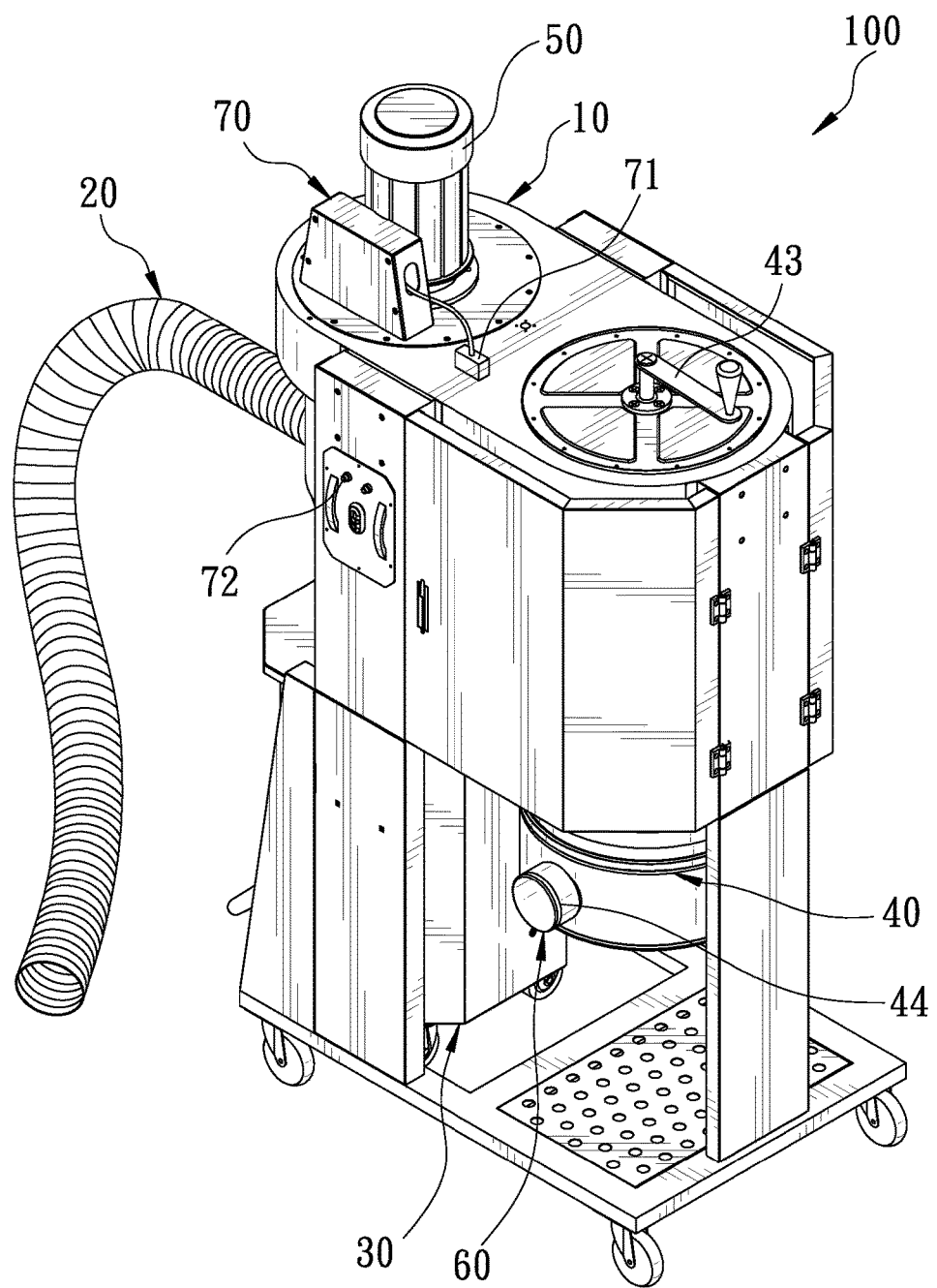
FIG. 2 is a perspective view of a dust collector in accordance with the present invention.
Figure 3:
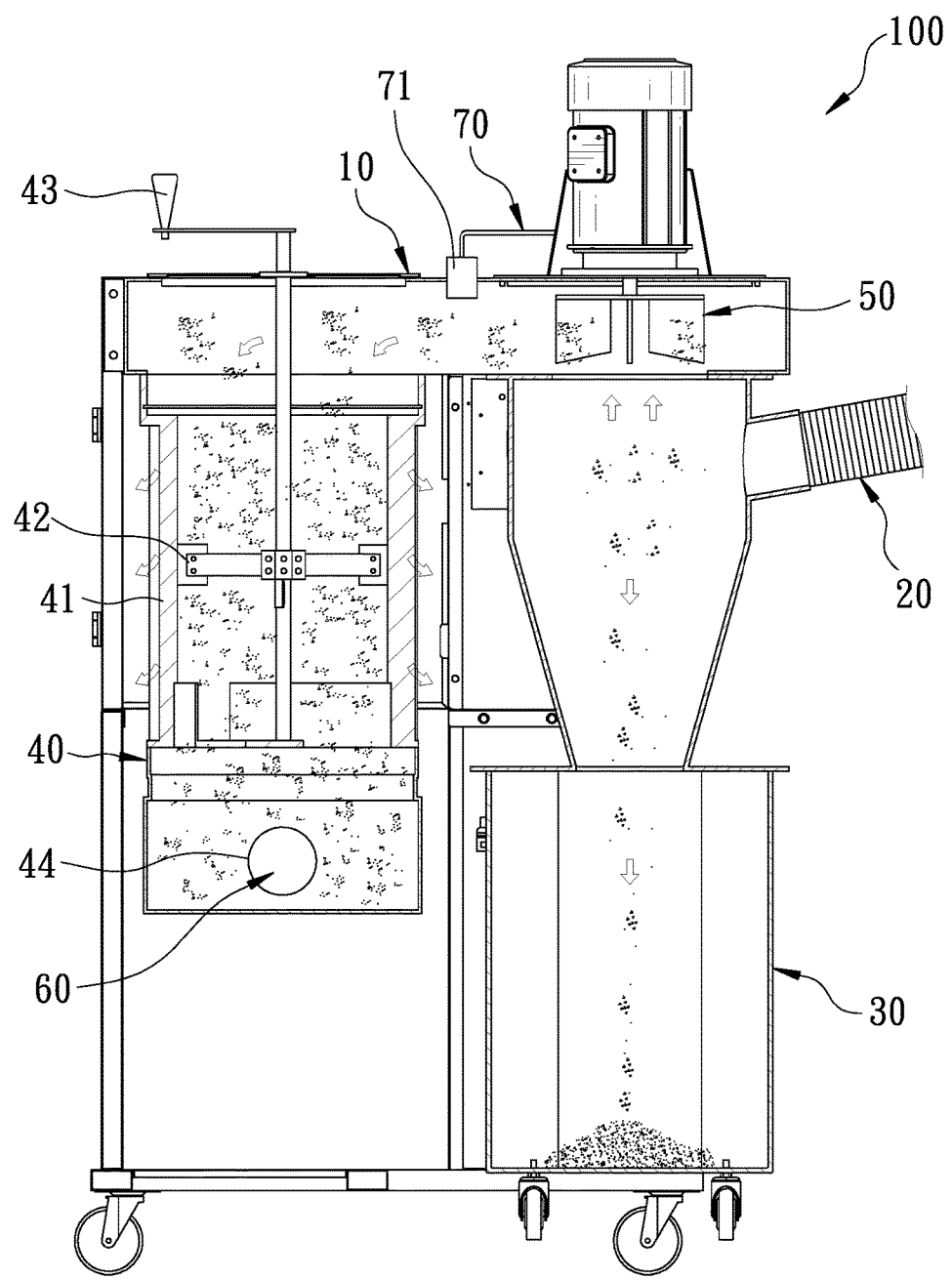
FIG. 3 is a partially sectional view of the dust collector in accordance to the present invention illustrating the same being in use for dust collection.

Referring to FIG. 2 and FIG. 3 which are a perspective view of a dust collector in accordance with the present invention and a partially sectional view of the dust collector illustrating the same being in use for dust collection, a dust collector 100 comprises a collector body 10, a dust collection tube 20 telescopic shaped, a dust collection barrel 30 equipped under the dust collection tube 20.

A filter barrel 40 installed in the collector body 10 comprises a filter net 41 to filter the air mixed with dust and a dust clean device 42 installed in the filter barrel 40 which is operated by a handle 43 extended outward the filter barrel 40 and the collector body 10. There is an air outlet adaptor 44 formed at the lower portion of the filter barrel 40. The air outlet adaptor 44 is communicating with the inner portion of the filter net 41 of the filter barrel 40 and is also communicating with the dust collection tube 20. If the particulate dust contained in the driven air and filtered to stick on the filter net 41 reached a preset volume, the dust collector may automatically stop.

An air suction unit 50 is equipped in the collector body 10 to guide the environmental air into the collector body 10 through the dust collection tube 20. The air will be in turn driven to pass through the dust collection barrel 30 as well as the filter net 41 of the filter barrel 40. Filtered clean air will be released out of the collector body 10. It is readily to know that the air suction unit 50 can be an air pump or an electric fan.

A cover 60 can be fitted onto the air outlet adaptor 44 to either close or open the same.

A dust detection unit 70 comprises a dust detection device 71 which is installed in the collector body 10 and an alarm device 72. The function of the dust detection unit 70 is to detect the particulate dust volume filtered and contained on the filter net 41 d and in the dust collection barrel 30. It is readily to know that the dust detection device 71 can be a pressure sensor and the alarm device 72 can be a LED.

When the dust collector 100 in accordance to the present invention is actuated to function the particulate dust collection, please still refer to FIGS. 2 and 3. The cover 60 shut the air outlet adaptor 44 of the filter barrel 40. The environmental air will be driven into the collector body 10 through dust collection tube 20. The heavier particulate dust will drop and stored in the dust collection barrel 30. Relatively cleaned air will then be filtered by the filter net 41 of the filter barrel 40 and release to the outside of the collector body 10. During the operation of dust collection, the detection device 71 and alarm device 72 will keep on monitoring the dust volume on the filter net 41 and in the dust collection barrel 30 to make sure an effective operation of the dust collection.

Figure 4:
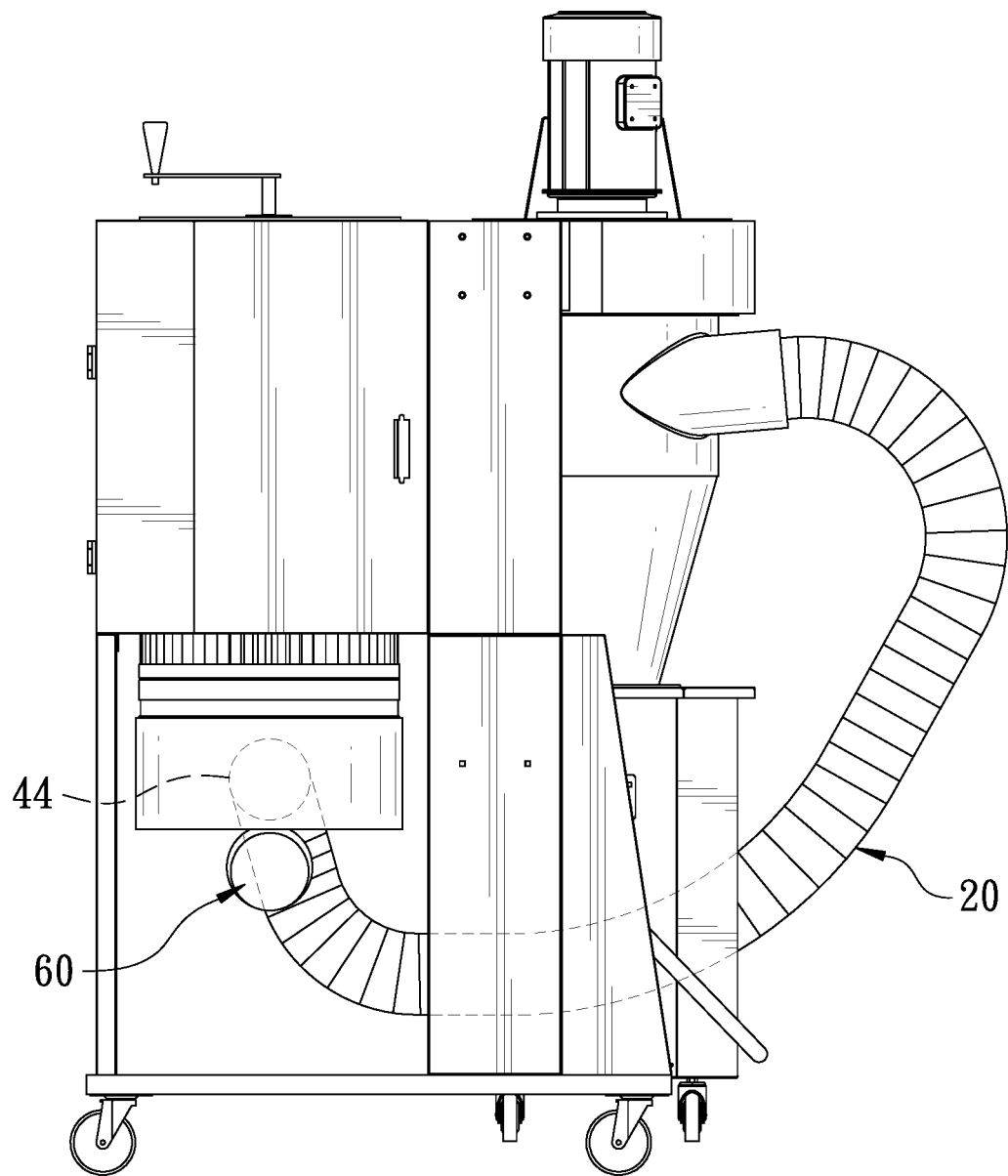
FIG. 4 is an illustrative view of the dust collector in accordance with the present invention showing the dust collection tube being connected to the air outlet adaptor.
Figure 5:
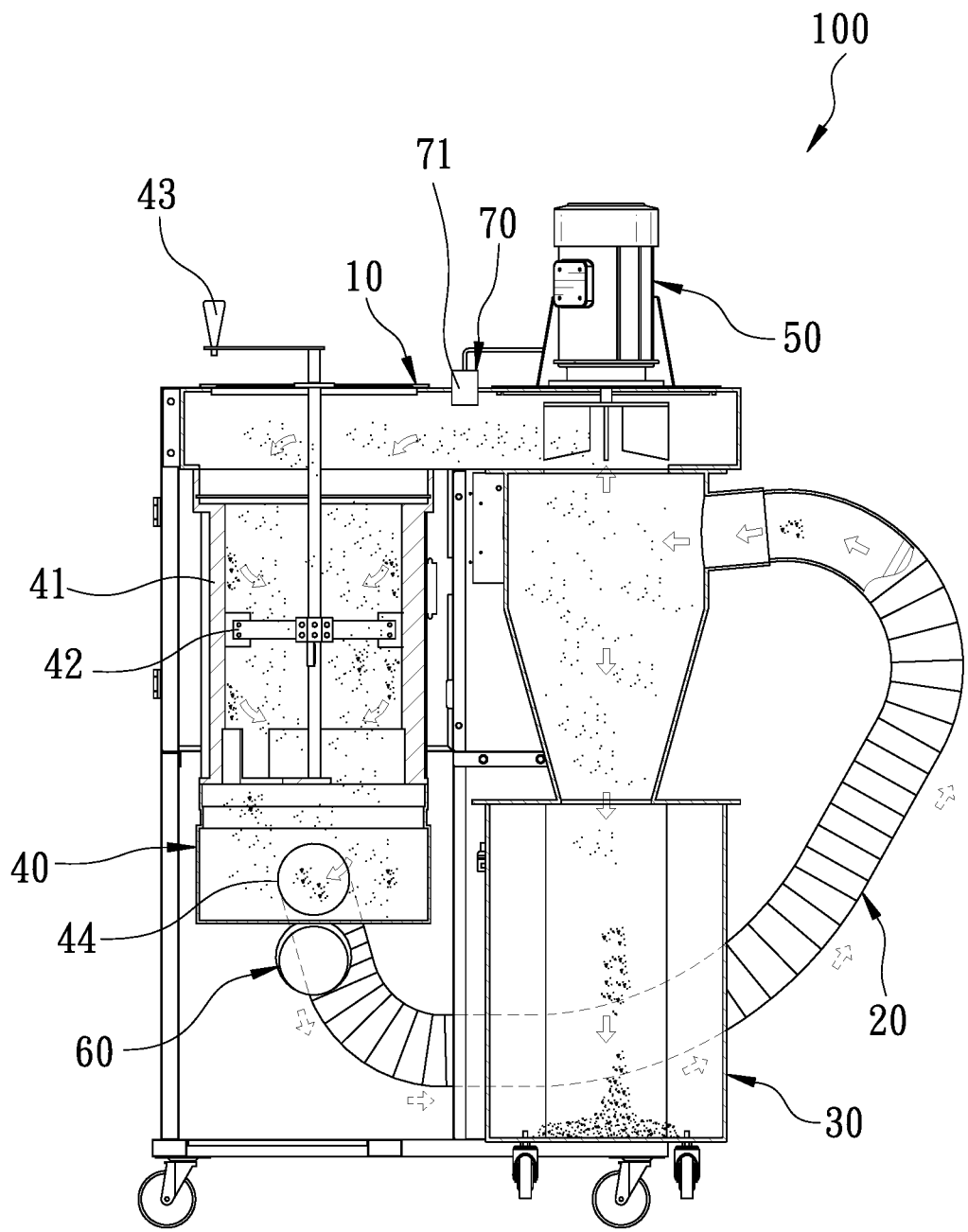
FIG. 5 is an illustrative view of the dust collector in accordance with the present invention showing the collector is under clean maintenance to recollect the particulate dust.

Referring to FIGS. 4 and 5 which are illustrative views of the dust collector in accordance with the present invention showing the dust collection tube being connected to the air outlet adaptor and under clean maintenance to recollect the particulate dust, it is understood the cover 60 will be fixed onto the air outlet adaptor 44 so that the dust collector 100 will operate its dust collection function. The particulate dust will either be dropped in the dust collection barrel 30 or trapped by the filter net 41 of the filter barrel 40.

When the particulate dust has been accumulated on the filter net 41 more than a preset volume, the dust collector 100 needs to operate its clean maintenance process. The cover 60 will be uncovered from the air outlet adaptor 44 and one end of the dust collection tube 20 will be fixed onto the air outlet adaptor 44. By rotating the handle 43, dust clean device 42 will be actuated to sweep and clean the filter net 41 causing the particulate dust to drop in the filter barrel 40 and then sucked into the dust collection barrel 30 through the dust collection tube 20. The filter net 41 and the filter barrel will be cleaned without a secondary pollution during the clean maintenance.

Figure 6:
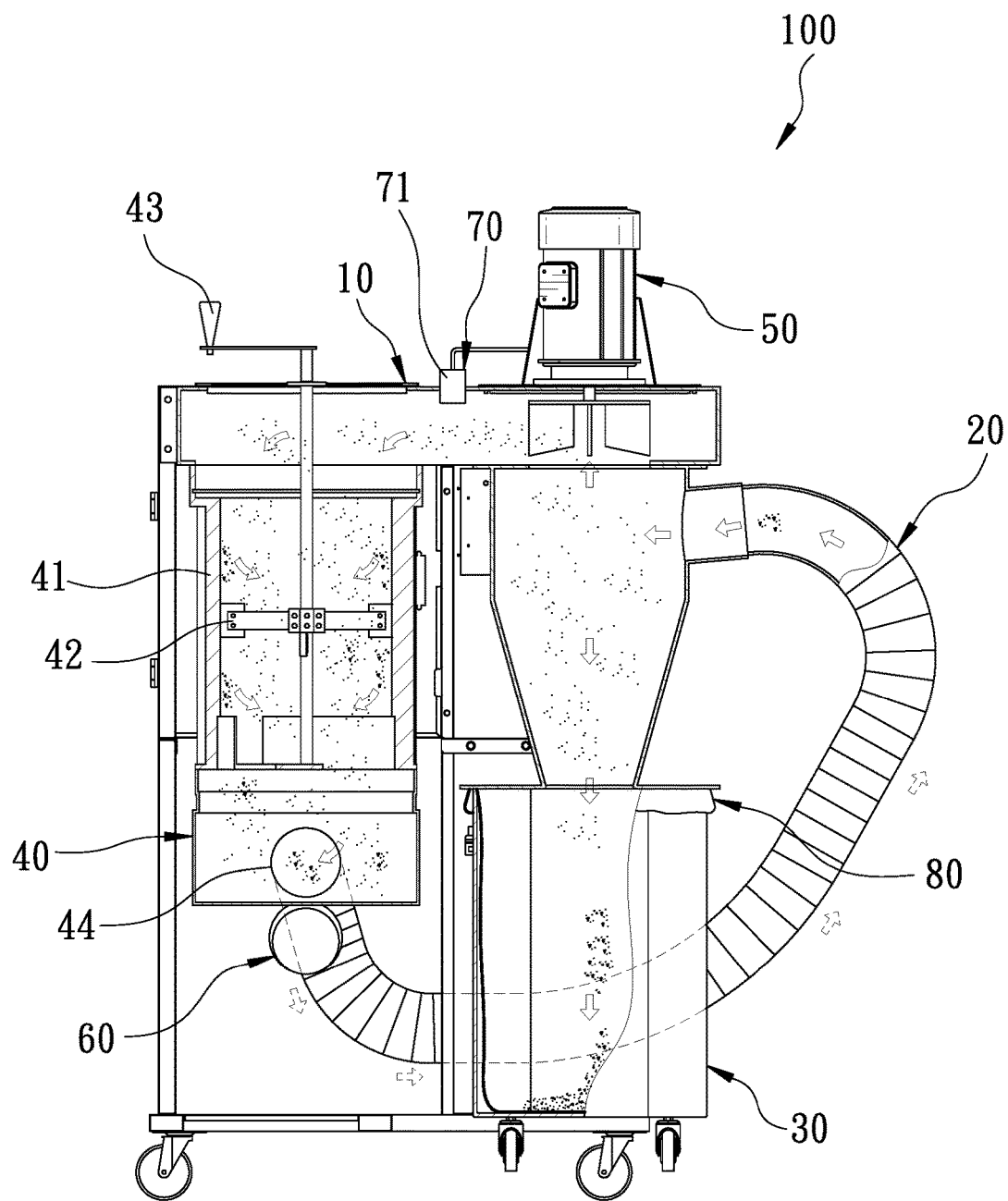
FIG. 6 is an illustrative view of a second embodiment of the dust collector in accordance with the present invention showing a dust collection bag is contained in the dust collection barrel.

Referring to FIG. 6 which is an illustrative view of a second embodiment of the dust collector in accordance with the present invention, a dust collection bag 80 is equipped in the dust collection barrel 30. The dust collection bag 80 can be removed and littered from the dust collector 100 when the particulate dust has been collected almost full in the dust collection bag 80. The alarm device 72 serves the function to remind the user to conduct the clean maintenance. By this way, there will be no secondary pollution.

Although the dust collector capable of recollecting particulate dust in the filtered barrel in accordance with the present invention has been described by way of preferred embodiment, it will become apparent and easily understood that changes, improvement and modifications may still be possible but without departing from the spirit of the current invention and still fallen in the protection scope as the claims of the invention.

What is claimed is:

1. A dust collector capable of recollecting particulate dust in a filter barrel comprising:
   a collector body;
   a dust collection tube;
   the dust collection tube being connected to the collector body;
   a dust collection barrel;
   the dust collection barrel being installed in the collector body;
   an air suction unit;
   the air suction unit being installed in the dust collector body;
   the air suction unit being connected to the dust collection tube;
   a filter barrel;
   the filter barrel comprising a filter net and a dust clean device, an air outlet adaptor, a conduit with one end communicating with an inner portion of the filter net and the other end of the conduit communicating with the air outlet adaptor, and a cover to be fixed on the air outlet adaptor;
   in response to the particulate dust being accumulated on the filter net more than a preset volume, the dust collector operating a clean maintenance process;
   in response to the dust collector operating the clean maintenance process, the cover being uncovered from the air outlet adaptor, one end of the dust collection tube being fixed onto the air outlet adaptor; and
   in response to the dust clean device being actuated to sweep and clean the filter net, the particulate dust dropping in the filter barrel and then being sucked into the dust collection barrel through the dust collection tube so that the filter net and the filter barrel is cleaned without a secondary pollution during the clean maintenance.

2. A dust collector capable of recollecting particulate dust in a filter barrel as claimed in claim 1 wherein the dust clean device of the filter barrel comprises a handle extending out of the filter barrel and the collector body.

3. A Dust collector capable of recollecting particulate dust in a filter barrel as claimed in claim 1 further comprising a dust detection unit which has a dust detection device and an alarm device.

4. A Dust collector capable of recollecting particulate dust in a filter barrel as claimed in claim 1 wherein the dust collection tube is telescopic.

5. A Dust collector capable of recollecting particulate dust in a filter barrel as claimed in claim 1 wherein the air suction unit is an air pump.

6. A Dust collector capable of recollecting particulate dust in a filter barrel as claimed in claim 1 wherein the air suction unit is a blower fan.

7. A dust collector capable of recollecting particulate dust in a filter barrel as claimed in claim 1 further comprises a dust collection bag in the dust collection barrel.

8. A dust collector capable of recollecting particulate dust in a filter barrel as claimed in claim 1 wherein the dust collection barrel is installed approximately beneath the dust collection tube.

* * * * *